United States Patent [19]

De Klerk et al.

[11] 4,289,422
[45] Sep. 15, 1981

[54] COMPACTOR

[75] Inventors: Pieter B. De Klerk, Germiston; Andries G. Velthuysen, Pretoria, both of South Africa

[73] Assignee: Fowler Holdings Limited, Pretoria, South Africa

[21] Appl. No.: 77,118

[22] Filed: Sep. 19, 1979

[30] Foreign Application Priority Data

Sep. 25, 1978 [ZA] South Africa ..................... 77/5437

[51] Int. Cl.³ ............................................. E01C 19/26
[52] U.S. Cl. ...................................... 404/124; 172/537
[58] Field of Search ..................... 404/124, 122, 128; 180/20; 172/537, 539

[56] References Cited

U.S. PATENT DOCUMENTS

| 1,211,558 | 1/1917 | Drummond | 404/128 |
|---|---|---|---|
| 2,359,519 | 10/1944 | Gretner | 404/122 X |
| 2,455,636 | 12/1948 | Woolson | 404/122 X |
| 2,909,106 | 10/1959 | Berrange | 404/124 |
| 3,316,822 | 5/1967 | Seaman | 404/128 |
| 3,625,120 | 12/1971 | Nagy | 404/122 |
| 3,950,110 | 4/1976 | Clifford | 404/124 |
| 3,966,346 | 6/1976 | Berrange | 404/124 |
| 4,147,448 | 4/1979 | Jeffery | 404/124 |

FOREIGN PATENT DOCUMENTS

| 69/8854 | 8/1970 | South Africa . |
|---|---|---|
| 69/2360 | 10/1970 | South Africa . |
| 72/8555 | 3/1974 | South Africa . |
| 73/2253 | 5/1974 | South Africa . |
| 73/3162 | 11/1974 | South Africa . |
| 74/2502 | 6/1975 | South Africa . |
| 75/7297 | 5/1977 | South Africa . |
| 77/3141 | 9/1978 | South Africa . |
| 73/2367 | 10/1978 | South Africa . |

Primary Examiner—Nile C. Byers, Jr.
Attorney, Agent, or Firm—John H. Mulholland

[57] ABSTRACT

The invention concerns an impact compactor comprising a noncircular roller, draft arms positioned on both sides of the roller, axle means supported about the draft arms and on which the roller is mounted for rotation, a draw bar pivotally connected to the draft arms for towing the roller, and a gear and pinion linkage between the roller and the draft arms. Outer gears may be fast with each side of the roller. Each draft arm may support a stub shaft on which a pinion is mounted to mesh with the outer gear and to co-operate with a ratchet mounted on the draft arm. A buffering device can be provided between the draft arms and the draw bar.

6 Claims, 2 Drawing Figures

COMPACTOR

This invention relates to compactors.

Compactors of the impact type have been developed for compacting the base of an area. They are used in the construction of roads or the like to provide a compacted surface. Such compactors frequently comprise a heavy non-circular roller having a plurality of curved corners or "lobes", the roller being mounted about an axle on a framework which is towed by a prime mover such as a tractor. As the roller is towed, it pivots about one of the corners as a fulcrum and descends suddenly on the surface immediately in front of the fulcrum. Great impact is exerted on this area before the roller pivots about the next corner.

It has been found that, with the impact compactors known to the inventors, a problem arises with the force which is transferred to the framework and, subsequently to the tractor. The frameworks sometimes break. At other times the tractors are damaged, or there is even danger and discomfort to the operator. If a framework or tractor is broken, there is also the problem of having to move this heavy mass of machinery before work can continue on the area.

Various proposals have been made for overcoming these problems. In one proposal, the framework has included a set of arms between a draw frame on which the axle is mounted and the tractor towing hitch, the set of arms being able to execute a concertina movement and being joined by double acting shock absorbers. In another proposal, an intermittently acting restraint means engages the roller from time to time to restrain undesired movement relative to the frame.

In other proposals, mechanical and hydraulic linkages between the axle and the draw frame, or the combination of linkages between the axle and the draw frame, or the combination of linkages and biassing means have been prepared. Pneumatic cushioning and special suspension systems have all been tried but there is still room for improvement.

We have now developed a system for use on an impact compactor which, by means of a relatively simple arrangement, provides a cushioning effect for the forces which arise on using the compactor.

The present invention provides an impact compactor comprising a noncircular roller, draft arms positioned on both sides of the roller, axle means supported about the draft arms and on which the roller is mounted for rotation, a draw bar pivotally connected to the draft arms for towing the roller, and a gear and pinion linkage between the roller and the draft arms.

The roller can be of any suitable non-circular shape and the known shapes for impact rollers are preferred. In particular the impact roller may include four curved corners, or 'lobes'. The impact roller may have the axle means mounted at the centre thereof. The axle may be in the form of a continuous axle passing completely through the roller, or may comprise two stub shafts, one extending from opposite ends of the roller. The axle may be fast with the roller or with the draft arm, or may be mounted on bearings with respect to both the roller and the draft arm.

The draft arms conveniently extend upwardly on both sides of the roller at an angle pointing rearwardly of the vertical passing through the axle. To maintain the draft arms in this position, the draw bar may be pivotally linked to the draft arms through one or more transverse torsion bars or another spring action device attached to the draft arms. A pivoted coupling can be provided to assist the axle means moving in the forward direction. The draw bar can be of a suitable shape to extend, from the pivoted mounting on the draft arms above the roller, to a position which is suitable for fitting to a standard tractor hitch at the other end. Thus, in side view, the draw bar may comprise substantially parallel end sections joined by an inclined central section. The draw bar can have a tow hitch provided at its front end.

The gear and pinion is fitted between the roller and the draft arm. Conveniently, a gear is mounted on one or both ends of the roller and is fast with the roller. The teeth of the gear which is fast with the roller may face towards or away from the axle, and mesh with teeth of an inner or outer gear wheel in the from of a pinion. Each pinion is itself mounted for rotation on a stub shaft about a draft arm.

Conveniently, a ratchet, biassed by a spring, is mounted on the draft arm and prevents the pinion from rotating in one direction. A wire sling or trek chain can be installed between the two draft arms above the roller to link the draft arms together and prevent them from separating. Cushioning buffers, e.g. in the form of rubber springs/stoppers may be fitted to the draw bars adjacent to the draft arms, the buffers being capable of limiting the clockwise movement of the draft arms. This can be very useful if a torsion bar or spring device breaks or if the compactor is towed faster than a speed which permits the roller to make a free fall.

A brace may extend from the draft arm on either side of the roller and rearwardly of the roller. The brace acts for strengthening and weight purposes. Further or alternatively, a sling may extend transversely between the draft arms.

Instead of having a generally curved nonconcentric roller, the roller can be of other shapes, eg of triangular shape. Irrespective of the shape, with the present invention, the roller is pulled forwardly and, when the centre of gravity falls outside a certain line, the roller tips forward freely with the ratchet enabling the roller to move only in that direction. Whilst falling, the pinion is free to rotate until such time as the ratchet prevents further movement. Thereafter, the roller is caused to pivot around a fulcrum which is the front bottom lobe of the roller.

As the roller is pulled forward, the draft arms tend to pivot about the axle means to a more vertical position, against the weight of the roller and cause the torsion bar to twist, and so be under tension. When the axle means passes in front of the vertical line through the fulcrum, the torsion bar acts on the draft arms and assists in forcing the axle means and hence the roller forwards.

The torsion bars have a cushioning effect and reduce the shock which is transferred from the roller when it is in free fall, and also when the tractor moves faster. The torsion bars assist the tractor and roller speed to be kept substantially constant. The torsion bars also are of assistance in moving the roller to a point of imbalance above the fulcrum.

The invention is illustrated in non-limiting manner by reference to the accompanying drawings in which.

Figure 1:
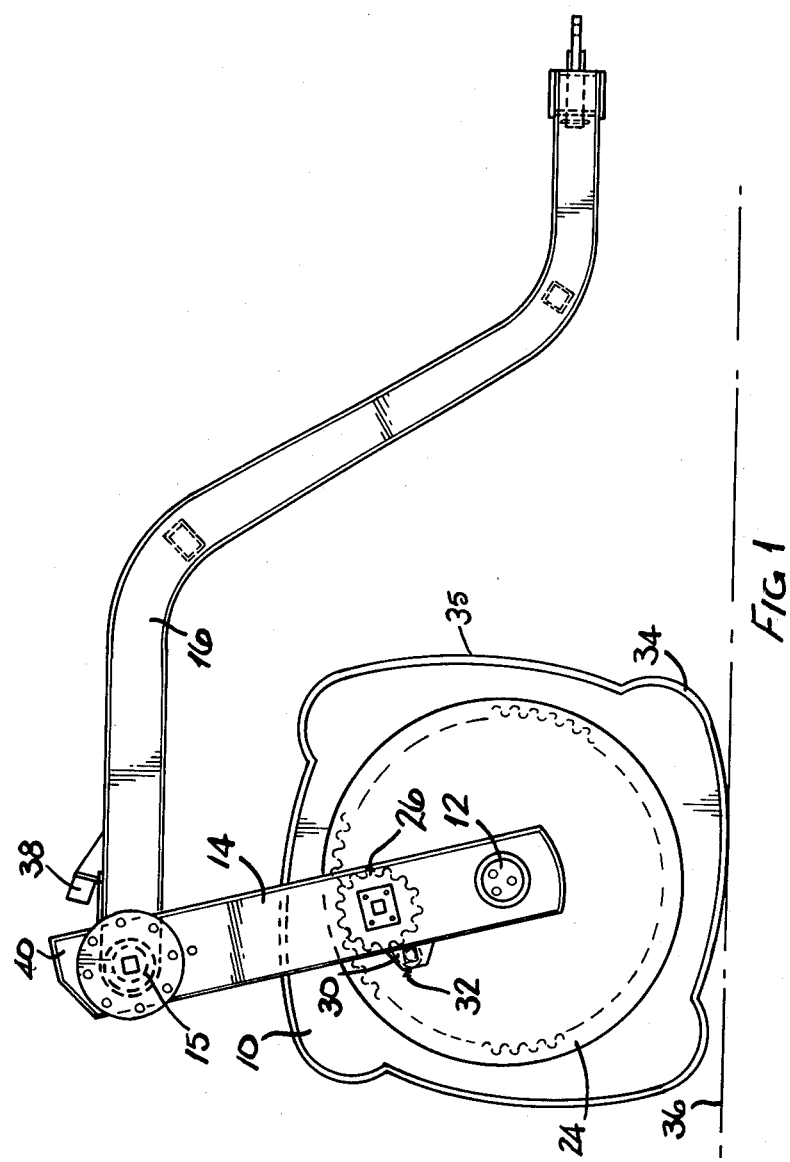
FIG. 1 is a side elevation of a compactor according to the invention.
Figure 2:
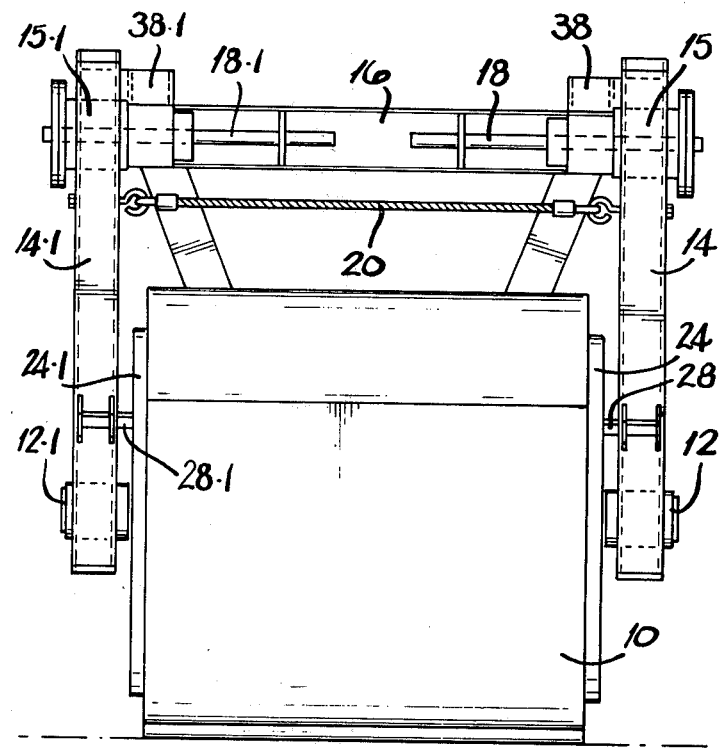
FIG. 2 is a rear view of the compactor.

In these figures, a roller 10 is supported on stub shafts 12.1. Draft arms 14, 14.1 extend upwardly from the stub shaft 12, 12.1 to pivoted couplings 15, 15.1 connected to a draw bar 16. The draw bar 16 is pivotally connected to the draft arms 14, 14.1 through torsion bars 18, 18.1, bushes and pivoted couplings 15, 15.1. A sling/trek chain 20 connects the draft arms 14, 14.1 and prevents the arms from moving apart. Fixedly mounted on the ends of the roller are gears 24, 24.1. These gears mesh with pinions 26, (only one visible) pivotally mounted on pinion stub shafts 28, 28.1 on the drafts arm 14, 14.1. Also mounted on the draft arms 14, 14.1 are ratchets 30 (only one visible) which are biassed by a spring 32 to the pinion.

In practice, the draft arms 14, 14.1 act as levers between stub shafts 12 and the draw bar 16.

As the roller 10 falls forwardly when the stub shafts 12 have passed forwardly of the vertical line between fulcrum point 34 and the stub shaft 12, the roller compresses the earth. As the roller 10 falls forward, the pinion 26 moves freely, as permitted by the ratchet 30 until the movement caused by the free-fall stops. Then the ratchet 30 locks pinion 26 and the roller 10 is rolled forward on roller surface 35 to compress that part of the ground 36 which is in front of the roller. Cushioned buffers 38, 38.1 are mounted on the draw bar 16 and abut against upper ends 40 if the draft arms 14, 14.1 move too far in a clockwise direction.

In practice, it has been found that tests show that a lighter tractor can be used than was otherwise the case for towing a roller of a particular mass and shape. The torsion bars take up the movement as the roller falls forward, thereby preventing or limiting damage to the tractor. It is to be noted that the draw bar pulls the draft arms from a position above the roller, not level with the axle of the roller.

In tests which have been carried out it has been found that with a 10,000 kg roller of the shape illustrated in the drawings, a smaller flywheel horsepower is necessary, compared with previous compactors known to the inventors.

We claim:

1. An impact compactor comprising a non-circular roller mounted for rotation about axle means, draft arms positioned on one or both sides of the roller and supporting between them the axle means, said draft arms extending upwardly from the axle means, a draw bar for towing the roller, said draw bar being pivotally connected through at least one torsion bar extending transversely of and above the roller to the draft arms, and a gear and pinion linkage between the roller and the draft arms.

2. A compactor as claimed in claim 1, wherein cushioned buffers are provided on the draw bar adjacent to the draft arms, said buffers being capable of limiting the clockwise movement of the draft arms.

3. A compactor as claimed in claim 1, wherein the draw bar has a towing hitch provided at its free end.

4. A compactor as claimed in claim 3, wherein the draw bar, in side view, comprises a pair of substantially parallel end sections joined by an inclined central section.

5. A compactor as claimed in claim 1, wherein gears are fast with each side of the roller, and wherein each draft arm supports a stub shaft on which a pinion is mounted to mesh with the gear and to co-operate with a ratchet mounted on the draft arm.

6. A compactor as claimed in claim 1, wherein a sling connects the draft arms.

* * * * *